Aug. 28, 1962     R. N. WEIL     3,051,116

LINE HOLDER

Filed Nov. 16, 1959

INVENTOR.
ROBERT N. WEIL
BY
Charles L. Lovercheck
attorney

United States Patent Office 3,051,116
Patented Aug. 28, 1962

3,051,116
LINE HOLDER
Robert N. Weil, 709 California Drive, Erie, Pa.
Filed Nov. 16, 1959, Ser. No. 853,399
8 Claims. (Cl. 114—199)

This invention relates to holders for rope lines and the like and, more particularly, to holders for lines used on sail boats.

Many holding devices for ropes have been previously suggested but in most of these previous holding devices, it was not possible to conveniently insert the line into the holding device and conveniently remove it therefrom. Others did not positively hold the line against inadvertent release.

It is, accordingly, an object of this invention to provide an improved holding device for ropes, lines, and the like.

Another object of the invention is to provide an improved guiding arrangement for a line in combination with an improved line holding device.

A further object of the invention is to provide an improved holding device which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
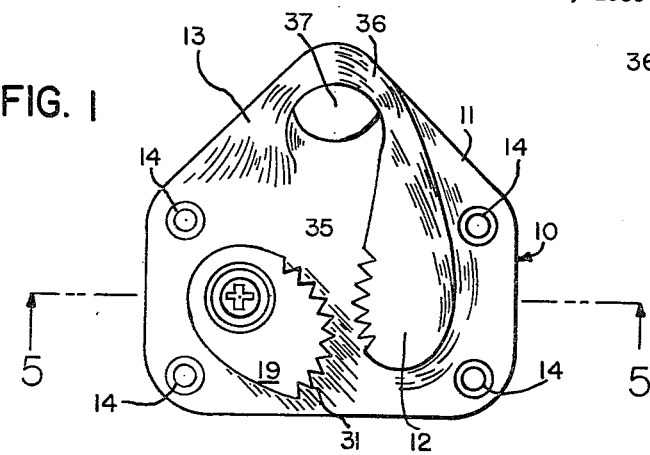
FIG. 1 is a top view of a line holding device according to the invention.
Figure 2:
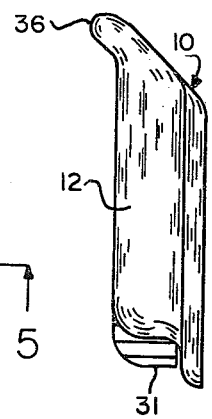
FIG. 2 is a side view of the device shown in FIG. 1.
Figure 3:
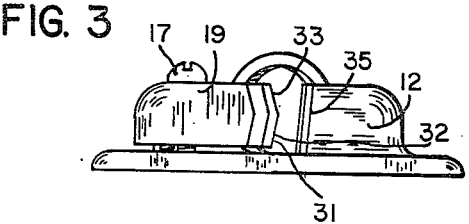
FIG. 3 is an end view of the device shown in FIG. 1.

Now with more specific reference to the drawing, a line holding device indicated generally at 10 may be considered to have a plate like body portion 11 for attaching the device 10 to a supporting member such as the deck of a sail boat. The plate like body 11 could also be considered to be a flange on an integral stop 12 which is integrally attached thereto. An integral boss 13 is also integrally attached to the stop 12.

The body 11 has spaced countersunk holes 14 therein for receiving suitable screws to attach the device 10 to a sail boat. The body 11 has a threaded bore 15 which receives a threaded stud 16 having a head 17 and a screw driver receiving slot 18. The stud 16 may be properly staked in the threaded bore 15 to prevent it from loosening. A movable cam 19 has a bore 20 therein which receives a sleeve 21 and is counterbored at 22 to receive the head 17 and a washer 23.

It will be noted that the sleeve 21 is longer than the distance from the bottom of the counterbore 22 to the top of the body or flange 11 so that the cam 19 will have ample clearance to freely turn on the lseeve 21. The stud 16 may be tightened down until the sleeve 21 is firmly held in place between the top of the plate like member 11 and the washer 23. The sleeve 21 could be made of some anti-friction material such as bronze or even a suitable plastic material such as Teflon. The cam 19, flange 11, and stop 12 could be made of brass, aluminum, or any other suitable metal or even plastic.

A groove 24 is formed in the bottom of the cam 19 concentric to the bore 20 therein and the groove 24 receives a helical spring 25. The helical spring 25 has an end 26 which is received in a hole 27 in the flange 11. The groove 24 has a peripheral notch 28 in the edge thereof which receives an end 29 of the spring 25. The spring 25 is stressed to urge the cam 19 to rotate in a counterclockwise direction when viewed from the top and toward the fixed stop 12 so that the cam 19 is urged to swing toward the stop 12.

The surface of the cam 19 having teeth 31 thereon is curved in a path having a center spaced from the center of the stud 16 about which the cam 19 may be rotated and the teeth 31 have a first portion 32 thereon which extends upwardly and toward the stop 12, then joining a second portion 33 which extends upwardly and away from the cam 19. Therefore, since the surface of teeth 35 extends upwardly and away from the cam 19, a line can be easily inserted between the cam 19 and the stop 12 by exerting a force downward on the line on each side of the stop 12.

The stop 12 terminates in an overlying member 36 which joins with the boss 13 and thereby overlies or bulges a space between it and the flange 11 and forms an eye 37 through which a line may extend. The eye 37 holds the line down in the cam 19 and prevents it from being inadvertently lifted out.

Figure 4:
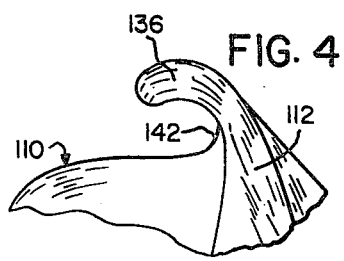
FIG. 4 is a broken view of another embodiment of the invention.
Figure 5:
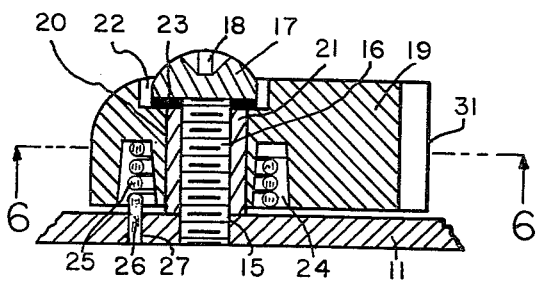
FIG. 5 is a cross sectional view taken on line 5—5 of FIG. 1.
Figure 6:
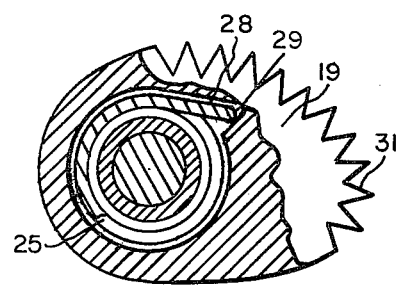
FIG. 6 is a partial cross sectional veiw taken on line 6—6 of FIG. 5.

In the embodiment of the invention shown in FIG. 4, a body 110 is shown similar to the plate like member 11 in FIG. 1. The body 110 has a stop 112 integrally attached thereto. The stop 112 terminates at its outer end in a hook 136 which serves the same purpose as the overlying member 36 to prevent the line from being inadvertently withdrawn from between the cam and the fixed member. This hook member 136 has an arcuate curved inner surface 142 to conform generally to the shape of a round line or rope. Therefore, a line can be quickly and readily detached from the entire holding device. Further, a line having a knot which might not pass through the eye 37 can be readily removed from under the hook 136 of the embodiment shown in FIG. 4.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A device for holding lines comprising a flat plate like member, a fixed stop attached to said plate like member and a cam, said cam being swingably attached to said plate like member and spaced therefrom, said cam having a curved toothed edge portion curved in a path having its center of curvature spaced from the center about which said cam is swingable, said curved edge portion extending from the side of said cam adjacent said plate like member away from said plate like member and toward said fixed stop forming a first portion of the teeth of said toothed portion and then from said plate like member and then away from said plate like member forming a second portion of said teeth and away from said stop whereby a line can be readily inserted between said cam and said stop past said first portion of said teeth into the space between said second portion of said teeth and said stop.

2. The device recited in claim 1 wherein said plate like member has a boss portion thereon spaced from said cam, said boss portion and said plate like member defining an eye, said eye being in alignment with a straight line passing between said stop and said cam, said eye being adapted to receive a line passing between said stop and said cam.

3. The device recited in claim 1 wherein said plate like member has a hook forming boss portion thereon spaced from said cam and adapted to overlie a line adapted to pass between said cam and said stop.

4. The device recited in claim 1 wherein said stop terminates in a hook portion spaced from said plate like member and adapted to overlie a line adapted to pass between said stop.

5. The device recited in claim 1 wherein said fixed stop is spaced from a boss on said plate like member, a bridging member extends between and is attached to said stop, and said boss defines an eye to receive a rope adapted to pass therebetween.

6. The device recited in claim 1 wherein the surface of said stop adjacent said cam is curved and extends away from said plate like member and from said cam whereby a line can be forced between said cam and said stop.

7. The device recited in claim 1 wherein said cam is attached to said plate like member by means of a headed stud disposed in a sleeve and attached to said plate like member, said sleeve being received in a bore in said cam and the head of said stud overlying said cam.

8. The device recited in claim 7 wherein a groove is formed in said cam generally concentric to said bore, and a helical spring is disposed in said groove, one end of said spring being attached to said plate like member, the other end of said spring being attached to said cam.

References Cited in the file of this patent

UNITED STATES PATENTS

| 1,107,934 | Hagan | Aug. 18, 1914 |
| 1,710,697 | Gilbert | Apr. 30, 1929 |
| 2,627,834 | Roberts et al. | Feb. 10, 1953 |

FOREIGN PATENTS

| 331,681 | Italy | Nov. 13, 1935 |

OTHER REFERENCES

Armstrong & Galbraith, Inc., catalogue 1943, page 47 relied upon.